United States Patent
Yoshida

(10) Patent No.: US 8,165,761 B2
(45) Date of Patent: Apr. 24, 2012

(54) APPARATUS TO CONTROL AIRBAG FOR SIDE COLLISION

(75) Inventor: Masatada Yoshida, Ichinomiya (JP)

(73) Assignees: Toyota Jidosha Kabushiki Kaisha, Aichi (JP); Denso Corporation, Aichi (JP)

( * ) Notice: Subject to any disclaimer, the term of this patent is extended or adjusted under 35 U.S.C. 154(b) by 419 days.

(21) Appl. No.: 12/597,120

(22) PCT Filed: May 12, 2008

(86) PCT No.: PCT/JP2008/058726
§ 371 (c)(1), (2), (4) Date: Oct. 22, 2009

(87) PCT Pub. No.: WO2008/140070
PCT Pub. Date: Nov. 20, 2008

(65) Prior Publication Data
US 2010/0138114 A1      Jun. 3, 2010

(30) Foreign Application Priority Data
May 11, 2007   (JP) ................. 2007-127154

(51) Int. Cl.
*B60R 21/32* (2006.01)
*G06F 19/00* (2006.01)
(52) U.S. Cl. ............... 701/46; 701/45; 280/735
(58) Field of Classification Search .......... 701/45, 701/46; 280/735; 340/435, 436
See application file for complete search history.

(56) References Cited

U.S. PATENT DOCUMENTS

| | | | |
|---|---|---|---|
| 5,014,810 A | 5/1991 | Mattes et al. | |
| 5,322,323 A | 6/1994 | Ohno et al. | |
| 5,785,347 A * | 7/1998 | Adolph et al. | 280/735 |
| 5,904,730 A | 5/1999 | Yamazaki et al. | |
| 6,594,570 B2 | 7/2003 | Nagao et al. | |
| 7,712,776 B2 * | 5/2010 | Prakah-Asante et al. | 280/735 |
| 2004/0000992 A1 * | 1/2004 | Cuddihy et al. | 340/436 |

FOREIGN PATENT DOCUMENTS

| | | |
|---|---|---|
| JP | 6-183313 A | 7/1994 |
| JP | 06-219237 A | 8/1994 |
| JP | 07-014810 A | 1/1995 |
| JP | 07-146364 A | 6/1995 |
| JP | 09-002172 A | 1/1997 |
| JP | 09-188219 A | 7/1997 |
| JP | 10-095305 A | 4/1998 |
| JP | 11-091498 A | 4/1999 |
| JP | 3095920 B2 | 10/2000 |
| KR | 20030060591 A | 7/2003 |
| WO | 2006091431 A1 | 8/2006 |

OTHER PUBLICATIONS

Extended European Search Report corresponding to European Patent Application No. 08 75 2606 dated May 19, 2010, 5 pages.

* cited by examiner

*Primary Examiner* — Tan Q Nguyen
(74) *Attorney, Agent, or Firm* — Sughrue Mion, PLLC

(57) ABSTRACT

An apparatus to control an airbag for a side collision includes a vehicle inclination detecting unit which detects an inclination of a vehicle relative to a horizontal direction, and a threshold value changing unit which changes a threshold value to operate the airbag for the side collision corresponding to the inclination of the vehicle relative to the horizontal direction detected by the vehicle inclination detecting unit.

5 Claims, 4 Drawing Sheets

APPARATUS TO CONTROL AIRBAG FOR SIDE COLLISION

TECHNICAL FIELD

The present invention relates to an apparatus to control an airbag for a side collision which is used in vehicles such as a passenger car, a truck, and a bus.

BACKGROUND ART

Conventionally, as an airbag control apparatus, an apparatus has been well known which detects an acceleration value caused by an impact with the use of a sensor and determines that an object collides with a vehicle when the detected acceleration value is equal to or greater than a predetermined value.

In addition, in order to prevent a false operation of an airbag when a door is closed from a door opening condition, an airbag control apparatus has been well known which does not operate the airbag by determining a threshold value based on an impact generated by a normal door closing operation.

In addition, an apparatus has been known. The apparatus provides a door opening or closing condition detecting unit and prohibits an airbag operation for a predetermined period after closing a door when the door opening or closing condition detecting unit has detected that the door has been closed, even if an acceleration sensor detects an acceleration value equal to or greater than a predetermined value (for example, see Patent Document 1).
[Patent document 1] Japanese Patent No. 3095920

In a conventional system which prevents a false operation of an airbag when a door is closed from a door opening condition, a threshold value is determined based on an impact on the vehicle when the door is closed in a case where a vehicle is horizontally positioned. However, actually, in many cases, a door is closed in a condition where a vehicle is inclined toward a right, left, front, or rear side relative to the horizontal direction due to an inclination of a road or a parking lot.

FIG. 1 is a diagram showing impacts (forces) on a vehicle when a door of the vehicle is closed in cases where the vehicle is positioned in a horizontal condition or an inclined condition. As shown in a lower part of FIG. 1, when a left side door is closed in a condition where the vehicle inclines toward the right side viewed from a driver of the vehicle, a door closing force becomes a force in which a door's own weight is added to a normal door closing force which is applied to the vehicle when the vehicle is horizontally positioned shown in an upper part of FIG. 1. That is, in the upper part of FIG. 1, when the vehicle is horizontally poisoned, only the normal door closing force (a conventionally assumed force) is applied to the vehicle; however, in the lower part of FIG. 1, a force greater that the conventionally assumed force is applied to the vehicle.

Therefore, even if the left side door is closed by the same force as the force in the condition where the vehicle is horizontally positioned, the left side door is closed with a velocity higher than a normal velocity in the inclined condition of the vehicle, and a force greater than an assumed force is applied to the vehicle. In this case, an impact greater than an assumed impact for determining a threshold value to operate the airbag is generated, and there is a risk that a false operation of the airbag occurs. On the other hand, when the threshold value is determined to be a high value to prevent the false operation of the airbag, the airbag may not be operated when an airbag operation is actually required.

DISCLOSURE OF INVENTION

Problems to be Solved by the Invention

One object of the present invention is to solve one or more aforementioned problems and to provide an apparatus to control an airbag for a side collision which prevents a false operation of an airbag by changing a threshold value to operate the airbag corresponding to an inclination of a vehicle relative to the horizontal direction.

Means for Solving the Problems

An aspect of the present invention provides an apparatus to control an airbag for a side collision. The apparatus to control the airbag for the side collision includes a vehicle inclination detecting unit which detects an inclination of a vehicle relative to a horizontal direction, and a threshold value changing unit which changes a threshold value to operate the airbag for the side collision corresponding to the inclination of the vehicle relative to the horizontal direction detected by the vehicle inclination detecting unit.

Another aspect of the present invention provides an apparatus to control an airbag for a side collision. The apparatus to control the airbag for the side collision includes a vehicle inclination detecting unit which detects an inclination of a vehicle relative to a horizontal direction, a door opening or closing condition detecting unit which detects a door opening or closing condition of a door of the vehicle, and a threshold value changing unit which changes a threshold value to operate the airbag for the side collision corresponding to the inclination of the vehicle relative to the horizontal direction detected by the vehicle inclination detecting unit and the door opening condition detected by the door opening or closing condition detecting unit.

According to another aspect of the present invention, the threshold value changing unit can change the threshold value to operate the airbag for the side collision of a right side when the vehicle inclines toward the left side or the rear side and a right door is in the opening condition, and changes the threshold value to operate the airbag for the side collision of a left side when the vehicle inclines toward the right side or the rear side and a left door is in the opening condition.

According to another aspect of the present invention, the threshold value changing unit does not need to change the threshold value to operate the airbag for the side collision when a door is in the closing condition detected by the door opening or closing condition detecting unit.

According to another aspect of the present invention, the threshold value changing unit does not need to change the threshold value to operate the airbag for the side collision when the vehicle in a rolling condition even if the vehicle inclines toward the right side, the left side, the rear side, or the front SIDE relative to the horizontal direction detected by the vehicle inclination detecting unit.

According to another aspect of the present invention, the threshold value changing unit can change the threshold value to operate the airbag for the side collision corresponding to a direction and intensity of wind pressure applied onto the vehicle.

In the present invention, the airbag for the side collision includes a side airbag positioned inside a seat back or a door of a vehicle to mainly protect a chest and a trunk of an on-vehicle person by being operated between the chest and the trunk of the on-vehicle person and the door when a side collision occurs, and a curtain shield airbag positioned along a roof side rail to mainly protect a head of the on-vehicle person by being operated between a position near the head of the on-vehicle person and an inner surface of the vehicle when a side collision occurs.

Advantageous Effect of the Invention

An embodiment of the present invention provides an apparatus to control an airbag for a side collision which prevents a false operation of the airbag.

EXPLANATION OF REFERENCES

10 Apparatus to control an airbag for a side collision
11 Right and left G sensors
12 Vehicle height sensors
13 Door switches
14 Airbag ECU
15 Airbag(s)

BEST MODE FOR CARRYING OUT THE INVENTION

The best mode for carrying out the invention is described with reference to the accompanying drawings.

Figure 2:
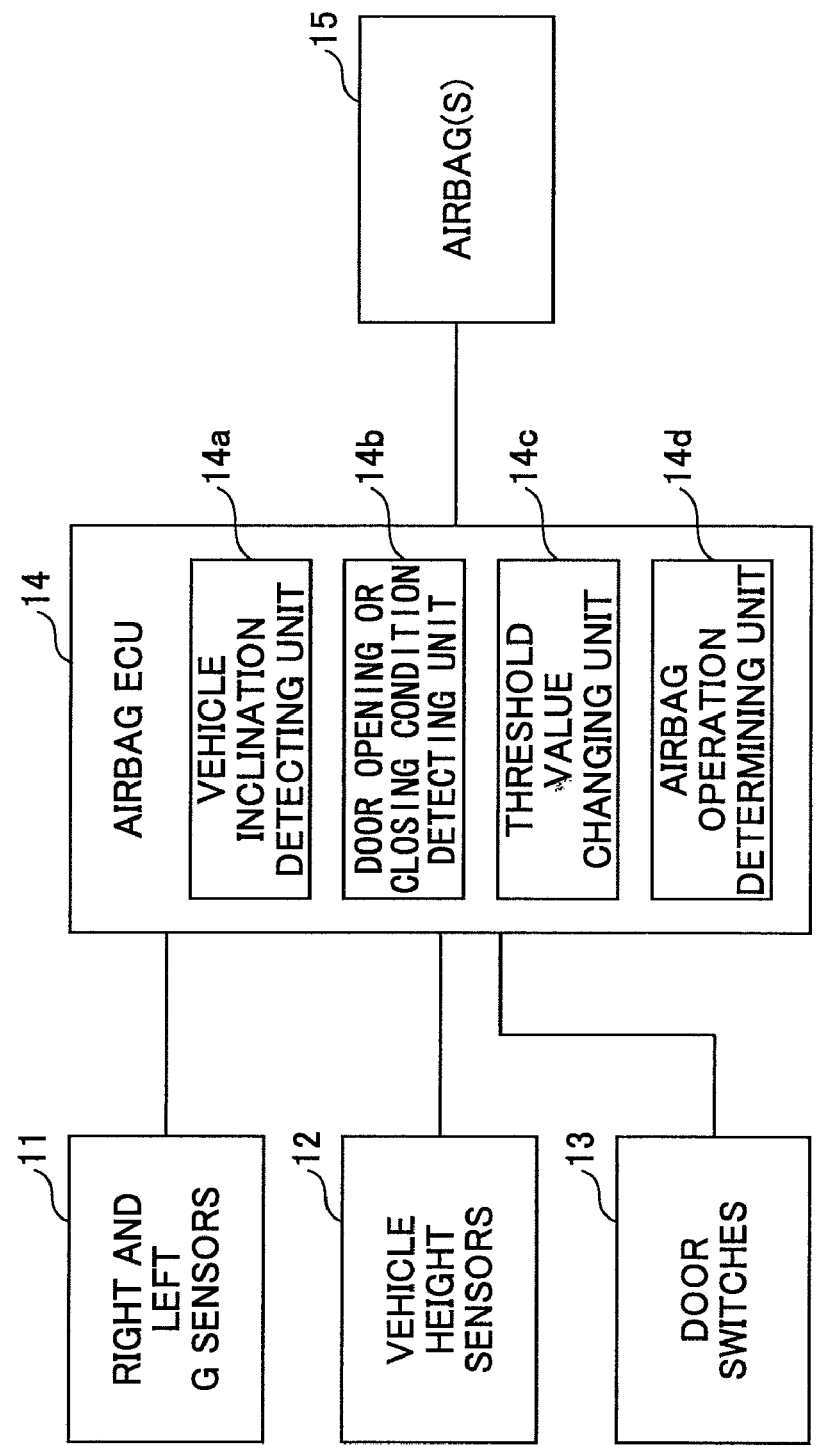
FIG. 2 is a diagram showing a system structure of an apparatus to control an airbag for a side collision according to an embodiment of the present invention.

FIG. 2 is a diagram showing a system structure of an apparatus to control an airbag for a side collision 10 according to an embodiment of the present invention.

In FIG. 2, the apparatus to control the airbag for the side collision 10 includes right and left G sensors 11 positioned at B pillars between a front door and a rear door (not shown) and C pillars between the rear doors and a rear glass (not shown) of a vehicle, height sensors 12 formed at right and left and front and rear positions (for example, right and left and front and rear wheels) of the vehicle, door switches 13, an airbag ECU (electrical control unit) 14, and airbags 15 (for side collision).

The airbag ECU 14 includes, for example, a CPU, a ROM, a RAM, and a bus for connecting the CPU, the ROM, and the RAM with each other, and is a control unit in which the CPU performs the following processes described below by executing a program stored in the ROM.

As shown in FIG. 2, the airbag ECU 14 is connected to the right and left G sensors 11 which detect an acceleration value applied to the right and left direction (the vehicle width direction) of the vehicle, the vehicle height sensors 12 which detect heights of the vehicle (vehicle height values) from the ground to spring elements of the suspensions, and the door switches 13 which detect a door opening condition or a door closing condition of doors of the vehicle. Signals detected by the right and left G sensors 11, the vehicle height sensors 12, and the door switches 13 are input to the airbag ECU 14.

As shown in FIG. 2, the airbag ECU 14 includes a vehicle inclination detecting unit 14a, a door opening or closing condition detecting unit 14b, a threshold value changing unit 14c, and an airbag operation determining unit 14d, and determines whether an object collides with a side of the vehicle based on the signals detected by the right and left G sensors 11, the vehicle height sensors 12, the door switches 13, and a predetermined threshold value to operate the airbag 15.

When an acceleration value detected by the right and left G sensors 11 is equal to or greater than a predetermined threshold value, the airbag ECU 14 determines that an object has collided with a side of the vehicle.

When the airbag ECU 14 determines that an object collides with a side of the vehicle, the airbag ECU 14 supplies a driving signal to an airbag ignition circuit (not shown) by using the airbag operation determining unit 14d and operates the airbag 15.

The airbag ECU 14 stores a predetermined threshold value to operate the airbag 15. The predetermined threshold value is calculated based on an impact on a vehicle, when a door is closed from an opening condition of the door with an assumed maximum force, in a horizontally positioned condition of the vehicle.

However, as described above, in some cases, when a door is closed from an opened condition of the door, a vehicle is actually inclined right and left or front and rear relative to the horizontal direction due to an inclination of a road or a parking lot.

Figure 1:
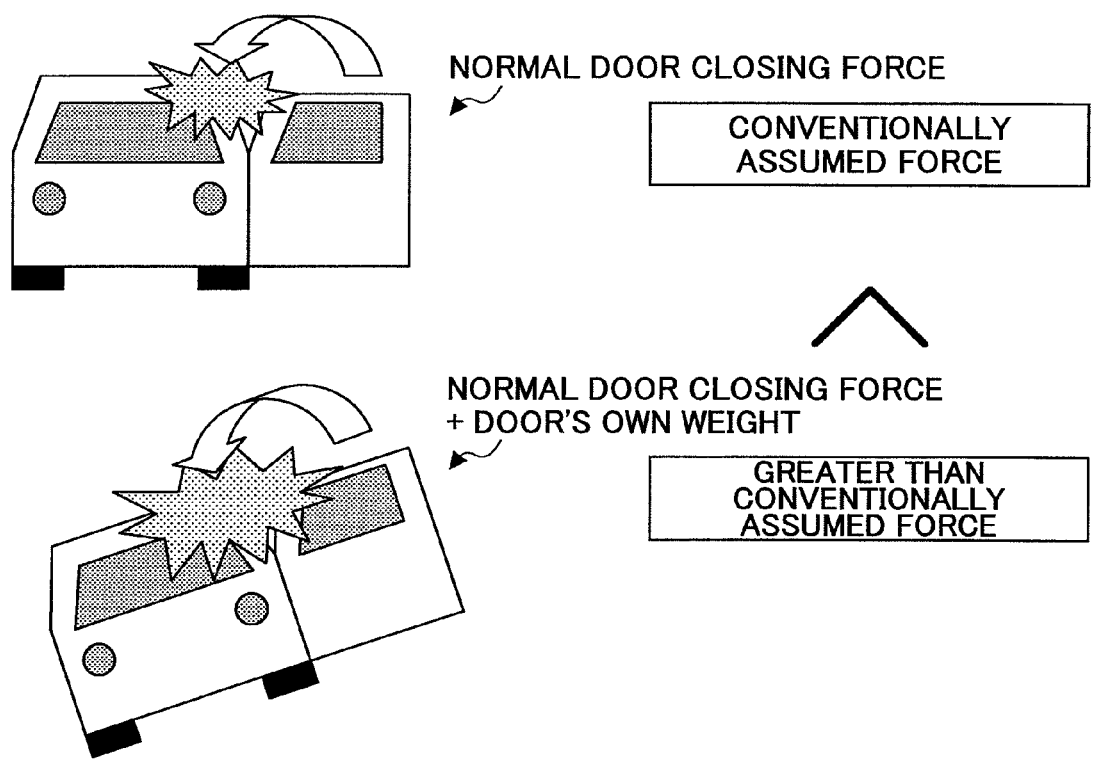
FIG. 1 is a diagram showing impacts on a vehicle when a door of the vehicle is closed in cases where the vehicle is positioned in a horizontal condition or an inclined condition.

As described by using FIG. 1, two cases are compared. In a first case, a left door of a vehicle is closed in a vehicle horizontally positioned condition viewed from a driver, and in a second case, a left door of a vehicle is closed in a vehicle inclined condition toward the right side relative to the horizontal direction viewed from a driver. In the two cases, even if the closing forces by a person are the same in the first and second cases, in the second case, the left side door's own weight is added to the closing force by the person.

An impact on a vehicle caused by a door closing force when the vehicle inclines relative to the horizontal direction becomes greater than an impact on a vehicle caused by a door closing force when the vehicle is horizontally positioned. That is, when the vehicle inclines relative to the horizontal direction, since the door's own weight is added to the normal door closing force, the door is closed with a velocity higher than a normal velocity. Therefore, a great impact is applied onto the vehicle.

In order to prevent a false operation of an airbag caused by an impact on a vehicle when a door is closed, a threshold value for not operating the airbag is determined by a calculation. However, when the vehicle inclines relative to the horizontal direction, even if a door is closed by the same force as that when the vehicle is horizontally positioned, an impact greater than a conventionally assumed impact is applied onto the vehicle, and there is a risk that a false operation of the airbag occurs.

On the other hand, in a case where a threshold value to operate an airbag is determined to be a high value based on an impact on a vehicle by a door closing force when the vehicle inclines relative to the horizontal direction, when a collision occurs on a vehicle positioned horizontally, since the threshold value does not exceed the high threshold value, it is conceivable that the airbag is not operated.

Figure 3:
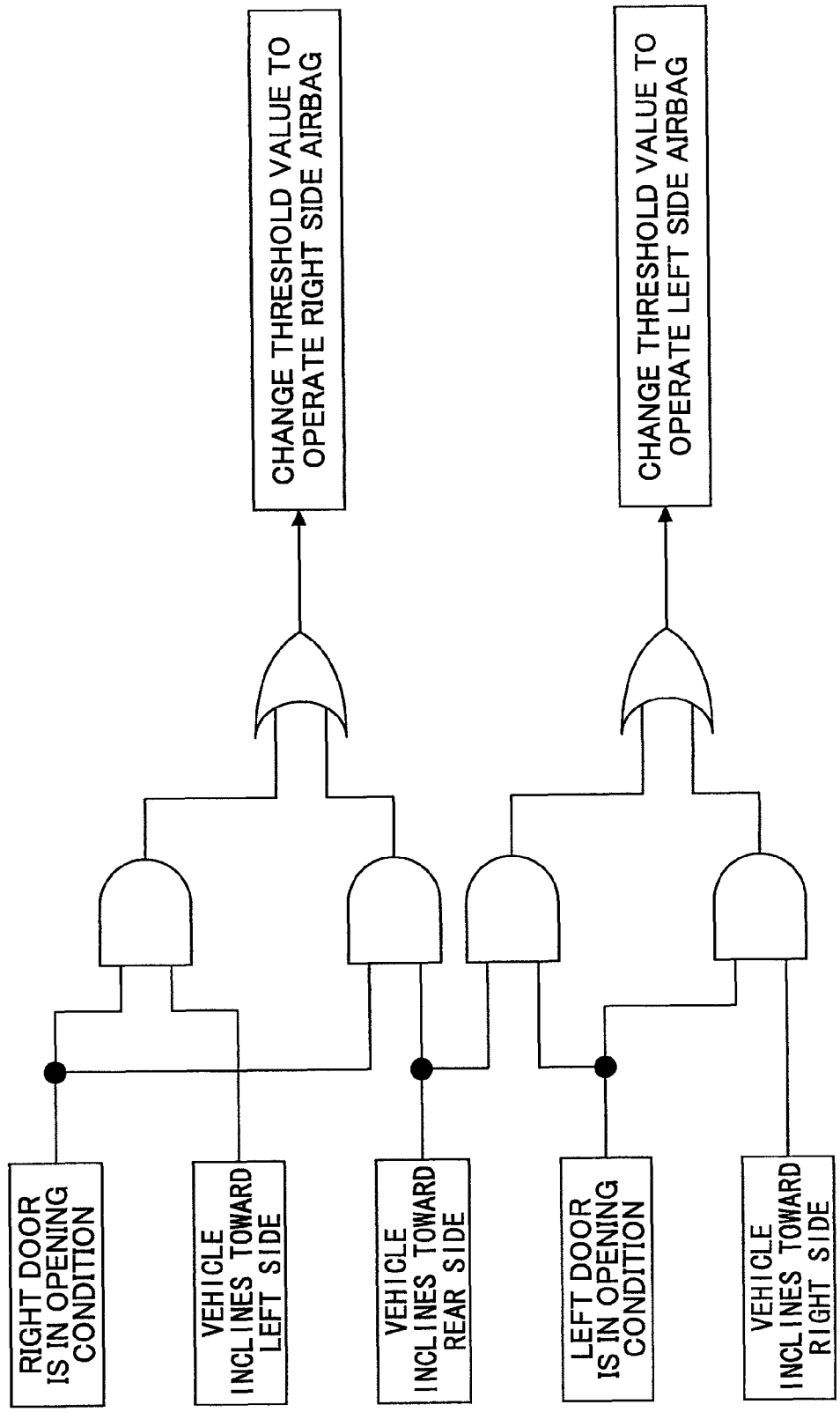
FIG. 3 is a diagram showing cases in which an impact equal to or greater than a conventionally assumed level is generated due to the inclination of the vehicle relative to the horizontal direction.

In order to solve the above problem, cases are formed as patterns in which an impact equal to or greater than a conventionally assumed level is generated due to the inclination of the vehicle relative to the horizontal direction. The airbag ECU 14 changes the threshold value by the threshold value changing unit 14c with the use of the patterns. FIG. 3 is a diagram showing the cases in which an impact equal to or greater than a conventionally assumed level is generated due to the inclination of the vehicle relative to the horizontal direction.

In FIG. 3, when a right door is closed from a right door opened condition in a condition where the vehicle inclines toward the left side or the rear side, a door closing force of the right door becomes a normal door closing force with the door's own weight. In this case, since an impact greater than an impact assumed when the right door is normally closed is applied onto the vehicle, a predetermined threshold value, by which the airbag 15 for a right side collision is operated, is changed to a value higher than the predetermined threshold value. With this, a false operation of the airbag 15 can be prevented.

On the other hand, in FIG. 3, when a left door is closed from a left door opened condition in a condition where the vehicle inclines toward the right side or the rear side, a door closing force of the left door becomes a normal door closing force with the door's own weight. In this case, since an impact greater than an impact assumed when the left door is normally closed is applied onto the vehicle, a predetermined threshold value, by which the airbag 15 for a left side collision is operated, is changed to a value higher than the predetermined threshold value. With this, a false operation of the airbag 15 can be prevented.

As described above, since the threshold value to operate the airbag 15 is changed corresponding to the door opening condition and the vehicle inclination condition, the false operation of the airbag 15 can be surely prevented.

Figure 4:
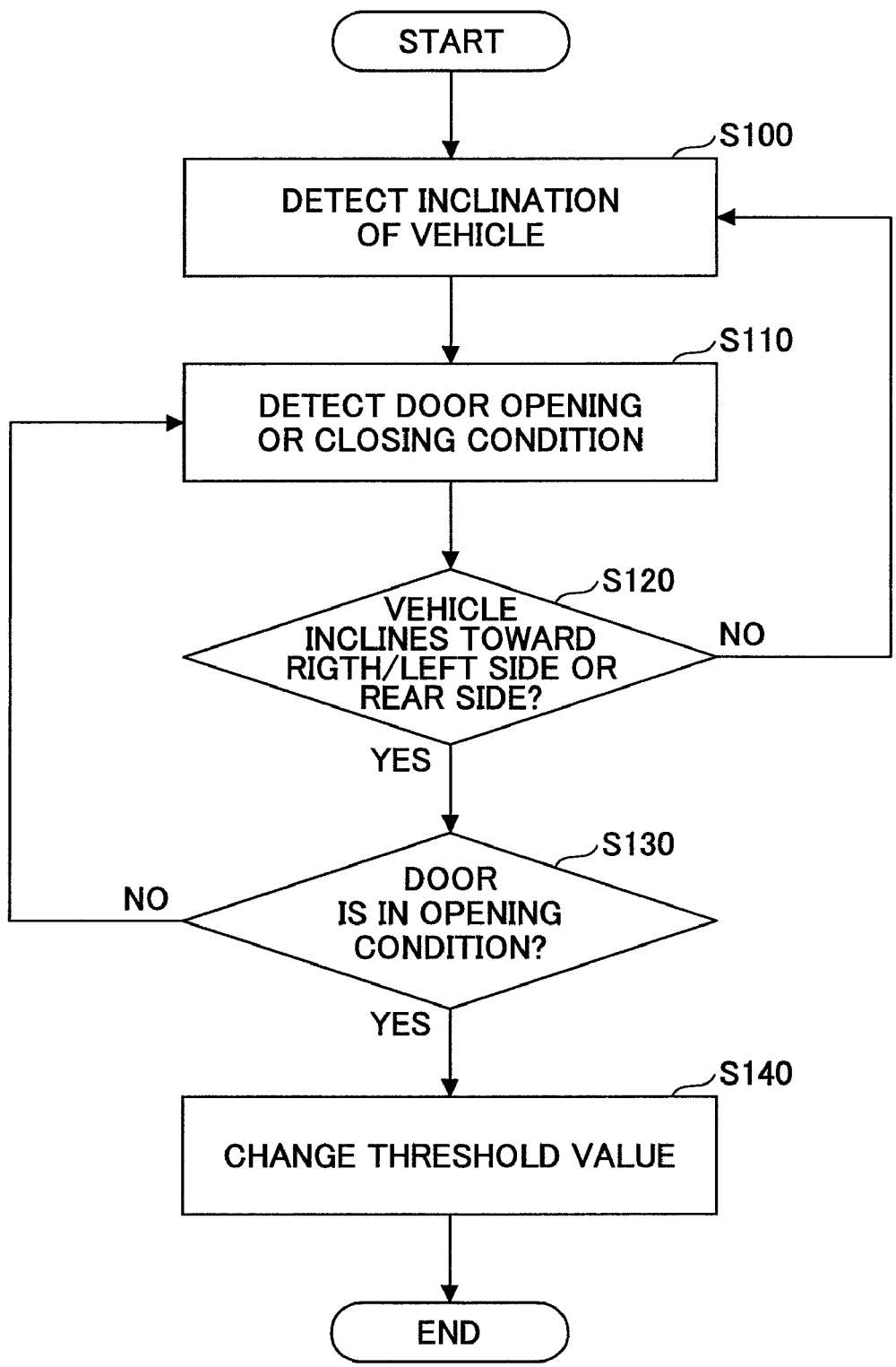
FIG. 4 is a flowchart showing control processes for changing a threshold value to operate an airbag by an airbag ECU according to the embodiment of the present invention.

Next, referring to FIG. 4, control processes by the apparatus to control the airbag for the side collision 10 according to the embodiment of the present invention are described. FIG. 4 is a flowchart showing control processes for changing a threshold value to operate an airbag by the airbag ECU 14 according to the embodiment of the present invention.

First, the vehicle inclination detecting unit 14a of the airbag ECU 14 detects an inclination of a vehicle relative to the horizontal direction based on vehicle posture information (vehicle height values) detected by the vehicle height sensors 12 (S100). For example, the vehicle inclination detecting unit 14a detects the inclination of the vehicle in the right side direction or the left side direction relative to the horizontal direction by comparing vehicle height values detected by the vehicle height sensors 12 of a front wheel and a rear wheel at the right side of the vehicle with vehicle height values detected by the vehicle height sensors 12 of a front wheel and a rear wheel at the left side of the vehicle.

That is, when the vehicle height values detected by the vehicle height sensors 12 at the left side of the vehicle are greater than the vehicle height values detected by the vehicle height sensors 12 at the right side of the vehicle, the vehicle inclination detecting unit 14a determines that the vehicle has inclined toward the right side relative to the horizontal direction. In addition, when the vehicle height values detected by the vehicle height sensors 12 at the left side of the vehicle are smaller than the vehicle height values detected by the vehicle height sensors 12 at the right side of the vehicle, the vehicle inclination detecting unit 14a determines that the vehicle has inclined toward the left side relative to the horizontal direction.

In addition, the vehicle inclination detecting unit 14a detects the inclination of the vehicle in the front or rear direction relative to the horizontal direction by comparing vehicle height values detected by the vehicle height sensors 12 of a right suspension and a left suspension of the front side of the vehicle with vehicle height values detected by the vehicle height sensors 12 of a right suspension and a left suspension of the rear side of the vehicle.

Next, the door opening or closing condition detecting unit 14b of the airbag ECU 14 detects whether a door is in an opening condition or a closing condition based on a signal detected by a door switch 13 (S110).

Then, the airbag ECU 14 determines whether the vehicle inclines toward the right/left side or the rear side (S120). When the vehicle inclines toward the left side or the rear side (YES in S120), the airbag ECU 14 determines whether the right door or the left door is in the opening condition (S130). When the vehicle inclines toward the left side or the rear side (YES in S120) and the right door is in the opening condition (YES in S130), the threshold value changing unit 14c changes a predetermined threshold value N to operate an airbag for a right side collision to a threshold value N2 by adding an adjusting value N1 to the predetermined threshold value N (S140).

When the vehicle inclines toward the right side or the rear side (YES in S120) and the left door is in the opening condition (YES in S130), the threshold value changing unit 14c changes a predetermined threshold value N to operate an airbag for a left side collision to a threshold value N2 by adding an adjusting value N1 to the predetermined threshold value N (S140).

The adjusting value N1 is different from each other among weight of doors, inclinations of vehicles relative to the horizontal direction, and so on. Therefore, each of the adjusting values has been calculated beforehand based on experiments and the calculated adjusting value N1 has been stored in the airbag ECU 14. The adjusting value N1 can be changed depending on actual situations.

In the embodiment of the present invention, the airbag ECU 14 detects the inclination of the vehicle relative to the horizontal direction by using the vehicle posture information detected by the vehicle height sensors 12. However, a device, which detects only the inclination of the vehicle relative to the horizontal direction, can be used without using the vehicle height sensors 12. Alternatively, an existing device, which detects the inclination of the vehicle relative to the horizontal direction, can be used to detect the inclination of the vehicle. For example, a G sensor positioned on a floor of the vehicle can be used in which acceleration values in three axes direction are detected.

In addition, in the embodiment of the present invention, when the vehicle inclination detecting unit 14a detects an inclination of the vehicle, the threshold value changing unit 14c changes the threshold value to operate the airbag 15. However, a rolling condition of a vehicle can be added to when the threshold value is changed. For example, when a rolling movement of a vehicle in the right and left directions is detected by using a roll rate sensor which detects a angular velocity (roll rate) in the rolling direction; that is, for example, when a rolling movement whose absolute value of the roll rate is equal to or greater than a predetermined value, it is possible to determine that the threshold value is not changed.

In addition, the door is normally opened or closed during a vehicle stopped condition; therefore, it is possible that the threshold value changing unit 14c does not change the threshold value during a vehicle driving condition in the embodiment of the present invention.

In addition, in the embodiment the present invention, the force to be applied onto the door is changed by the direction and intensity of wind pressure applied onto the door; therefore, the threshold value changing unit 14c can change the threshold value to operate the airbag 15 depending on the direction and intensity of the wind pressure. The direction and intensity of the wind pressure can be detected when, for example, wind pressure sensors are positioned on the vehicle.

As described above, according to the embodiment of the present invention, since the threshold value to operate the airbag is changed corresponding to the inclination of the vehicle, a false operation of the airbag can be prevented in the apparatus to control the airbag for the side collision 10.

Further, the present invention is not limited to the specifically disclosed embodiment, and variations and modifications may be made without departing from the scope of the present invention.

The present invention is based on Japanese Priority Patent Application No. 2007-127154 filed on May 11, 2007, the entire contents of which are hereby incorporated herein by reference.

The invention claimed is:

1. An apparatus to control an airbag for a side collision, comprising:
   a vehicle inclination detecting unit which detects an inclination of a vehicle relative to a horizontal direction;
   a door opening or closing condition detecting unit which detects a door opening or closing condition of a door of the vehicle; and
   a threshold value changing unit which changes a threshold value to operate the airbag for the side collision corresponding to the inclination of the vehicle relative to the horizontal direction detected by the vehicle inclination detecting unit and the door opening condition detected by the door opening or closing condition detecting unit.

2. The apparatus to control the airbag for the side collision as claimed in claim 1, wherein:
   the threshold value changing unit changes the threshold value to operate the airbag for the side collision of a right side when the vehicle inclines toward the left side or the rear side and a right door is in the opening condition, and changes the threshold value to operate the airbag for the side collision of a left side when the vehicle inclines toward the right side or the rear side and a left door is in the opening condition.

3. The apparatus to control the airbag for the side collision as claimed in claim 1, wherein:
   the threshold value changing unit does not change the threshold value to operate the airbag for the side collision when a door is in the closing condition detected by the door opening or closing condition detecting unit.

4. The apparatus to control the airbag for the side collision as claimed in claim 1, wherein:
   the threshold value changing unit does not change the threshold value to operate the airbag for the side collision when the vehicle in a rolling condition even if the vehicle inclines toward the right side, the left side, the rear side, or the front side relative to the horizontal direction detected by the vehicle inclination detecting unit.

5. The apparatus to control the airbag for the side collision as claimed in claim 1, wherein:
   the threshold value changing unit changes the threshold value to operate the airbag for the side collision corresponding to a direction and intensity of wind pressure applied onto the vehicle.

* * * * *